(12) United States Patent
Formo

(10) Patent No.: US 9,661,150 B2
(45) Date of Patent: May 23, 2017

(54) VERIFICATION OF NETWORK ACTIVITY/USAGE DATA

(71) Applicant: TELEFONAKTIEBOLAGET L M ERICSSON (PUBL), Stockholm (SE)

(72) Inventor: Joakim Formo, Åkersberga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/783,056

(22) PCT Filed: Apr. 8, 2013

(86) PCT No.: PCT/EP2013/057278
§ 371 (c)(1),
(2) Date: Oct. 7, 2015

(87) PCT Pub. No.: WO2014/166513
PCT Pub. Date: Oct. 16, 2014

(65) Prior Publication Data
US 2016/0072961 A1    Mar. 10, 2016

(51) Int. Cl.
| | | |
|---|---|---|
| H04M 15/00 | (2006.01) | |
| H04W 24/10 | (2009.01) | |
| H04L 12/14 | (2006.01) | |
| H04L 12/26 | (2006.01) | |

(52) U.S. Cl.
CPC ........ H04M 15/41 (2013.01); H04L 12/1403 (2013.01); H04L 43/16 (2013.01); H04M 15/60 (2013.01); H04W 24/10 (2013.01)

(58) Field of Classification Search
CPC ...... H04M 14/41; H04M 15/60; H04M 15/41; H04L 12/1403; H04L 43/16; H04L 47/24; H04L 51/18; H04L 63/08; H04L 67/14; H04L 45/00; H04W 28/20; H04W 8/18; G06Q 30/0205; G06Q 30/04
USPC .......... 455/406, 405, 410; 705/40, 7.33, 34, 705/14.26; 726/7; 709/227
See application file for complete search history.

(56) References Cited

U.S. PATENT DOCUMENTS

| | | |
|---|---|---|
| 6,321,338 B1 | 11/2001 | Porras et al. |
| 6,788,980 B1 | 9/2004 | Johnson |
| 2008/0091818 A1 | 4/2008 | Bailey et al. |

(Continued)

OTHER PUBLICATIONS

Notification of Transmittal of the International Search Report and Written Opinion dated May 29, 2013, in International Application No. PCT/EP2013/057278, 11 pages.

*Primary Examiner* — Phuoc H Doan
(74) *Attorney, Agent, or Firm* — Rothwell, Figg, Ernst & Manbeck, P.C.

(57) ABSTRACT

There is provided verification of network activity/usage data between a user equipment and a service provider server. The verification is performed in the service provider server. A first set of network activity/usage data for a user account is acquired from a user equipment. A second set of network activity/usage data for the user account is acquired from a subscription account of the user account. It is determined if a second post in the second set of network activity/usage data is related to a first post in the first set of network activity/usage data. If so, first data of the first post is compared to second data of the second post. The second post is updated with the first data in a case the first data does not match the second data.

18 Claims, 3 Drawing Sheets

(56) References Cited

U.S. PATENT DOCUMENTS

2013/0231080 A1* 9/2013 Cheuk ................ H04M 15/765
  455/405
2014/0187199 A1* 7/2014 Yan ....................... H04W 48/02
  455/410

* cited by examiner

VERIFICATION OF NETWORK ACTIVITY/USAGE DATA

CROSS REFERENCE TO RELATED APPLICATION(S)

This application is a 35 U.S.C. §371 National Phase Entry Application from PCT/EP2013/057278, filed Apr. 8, 2013, designating the United States, the disclosure of which is incorporated herein in its entirety by reference.

TECHNICAL FIELD

Embodiments presented herein relate to verifying network activity/usage data, and particularly to verifying network activity/usage data between a user equipment and a service provider server.

BACKGROUND

In mobile communications networks, there is always a challenge to obtain good performance and capacity for a given communications protocol, its parameters and the physical environment in which the mobile communications network is deployed.

The massive growth in telecommunications data produced every day makes tracking of network related activities of each individual subscriber difficult. Hence, there is always a challenge to obtain accurate information regarding network related activities of a subscriber.

One parameter related to network related activities of a subscriber is information associated with data traffic and/or voice traffic between a user equipment of the subscriber and a network node and/or access point of the network operator. Today, such information is collected and stored by the network operator.

However, there is a need for an improved handling of information associated with data traffic and/or voice traffic between a user equipment of the subscriber and a network node and/or access point of the network operator.

SUMMARY

An object of embodiments herein is to provide handling of information associated with data traffic and/or voice traffic between a user equipment of the subscriber and a network node and/or access point of the network operator.

The inventors of the enclosed embodiments have noted that existing mechanisms for handling such information rely on operator-side network usage data. The inventors of the enclosed embodiments have realized that the operator-side network usage data is according to existing mechanisms considered alone, without being verified against any other data source. Further, the inventors of the enclosed embodiments have to their surprise discovered that actual user equipment network usage does not always match the operator-side network usage data. Therefore, it may be desirable to consider also data provided by other entities when handling information associated with data traffic and/or voice traffic between a user equipment of the subscriber and a network node and/or access point of the network operator.

A particular object is therefore to provide improved handling of information associated with data traffic and/or voice traffic between a user equipment of the subscriber and a network node and/or access point of the network operator based on verifiable data.

According to a first aspect there is presented a method for verifying network activity/usage data between a user equipment and a service provider server. The method is performed in the service provider server. The method comprises acquiring a first set of network activity/usage data for a user account from a user equipment. The method comprises acquiring a second set of network activity/usage data for the user account from a subscription account of the user account. The method comprises determining if a second post in the second set of network activity/usage data is related to a first post in the first set of network activity/usage data. If so the method comprises comparing first data of the first post to second data of the second post. If so the method further comprises updating the second post with the first data in a case the first data does not match the second data.

Advantageously this enables detection of incorrect posts of data stored in the service provider server. Thereby, issuance of incorrect information from the service provider server may be avoided. For example, this may eliminate issuance of otherwise falsely allocated invoices, which could lead to customer dissatisfaction, reduced trust and contributing in the end to customer churn.

Further, detecting and eliminating (as achieved by the steps of determining, comparing, and updating) incorrect posts of data stored in the service provider server could reduce subscriber complaints and save resources in customer care, hence contributing to reduced network traffic.

According to a second aspect there is presented a service provider server for verifying network activity/usage data between a user equipment and the service provider server. The service provider server comprises an input/output, I/O, interface arranged to acquire a first set of network activity/usage data for a user account from a user equipment. The I/O interface is further arranged to acquire a second set of network activity/usage data for the user account from a subscription account of the user account. The service provider server comprises a processor arranged to determine if a second post in the second set of network activity/usage data is related to a first post in the first set of network activity/usage data. The processor is further arranged to compare first data of the first post to second data of the second post. The processor is arranged to update the second post with the first data in a case the first data does not match the second data.

According to a third aspect there is presented a computer program for verifying network activity/usage data between a user equipment and a service provider server. The computer program comprises computer program code which, when run on a service provider server, causes the service provider server to perform a method according to the first aspect.

According to a fourth aspect there is presented a computer program product comprising a computer program according to the third aspect and a computer readable means on which the computer program is stored. According to an embodiment the computer readable means are non-volatile computer readable means.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
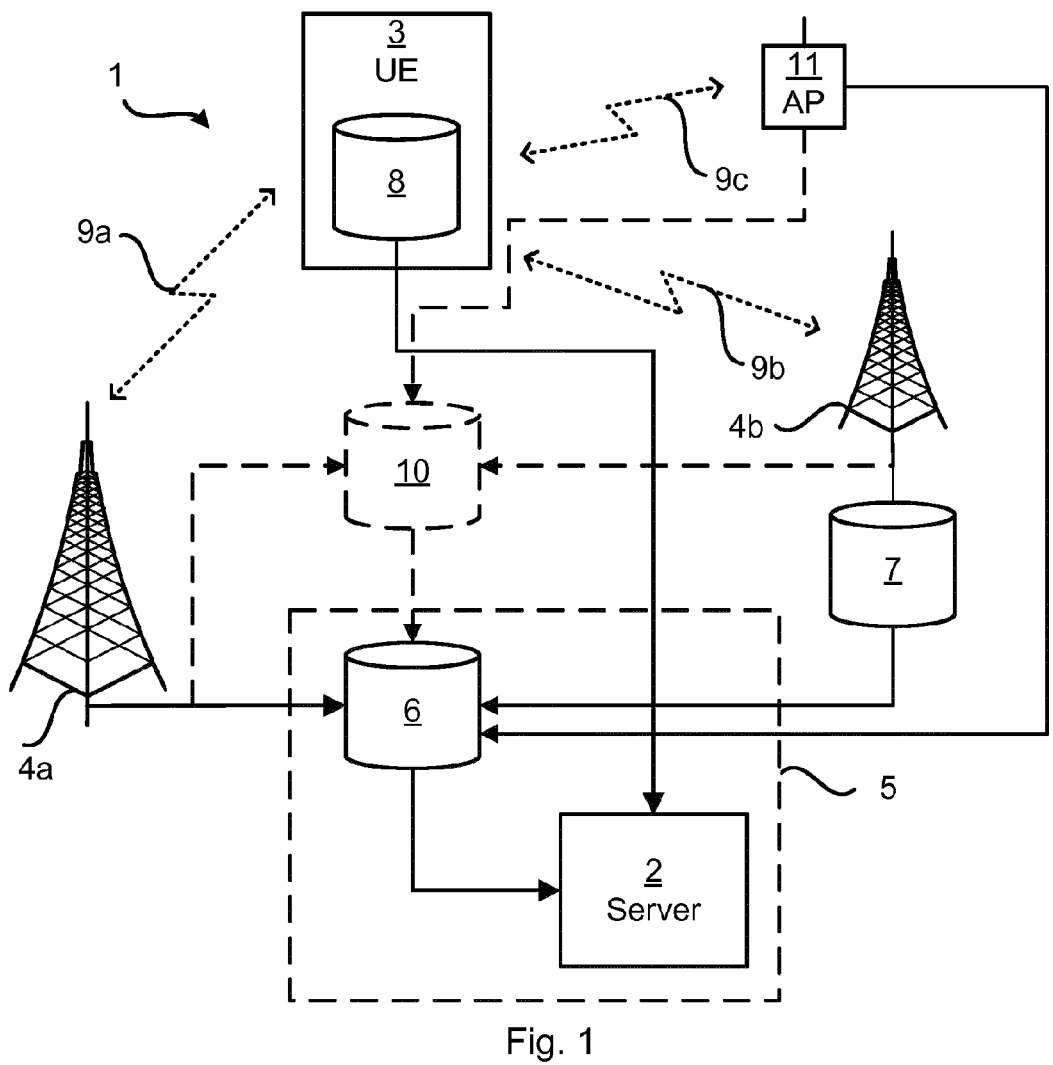
FIG. 1 is a schematic diagram illustrating a mobile communications network.

Presently there are a number of different service providers offering different kinds of telecommunications services to service subscribers. FIG. 1 is a schematic diagram illustrating a communications network 1 where embodiments of the herein disclosed concepts may be applied.

According to the communication network 1 of FIG. 1 a user equipment 3 is enabled to access a service network by establishing a wireless link 9a, 9b, 9c to a network node such as a base transceiver station (BTS), a NodeB (NB), an eNodeB, E-UTRAN NodeB, also known as Evolved NodeB, (eNB), and/or a WiFi access point (AP). BTS, NB, eNB, and AP will collectively be referred to as network nodes 4a, 4b, 11. Network nodes 4a and 4b are for illustrative purposes provided as BTS, NB or eNB whilst the network node 11 is provided as an AP. The communication network 1 may thus generally comply with any combination of W-CDMA (Wideband Code Division Multiple Access), LTE (Long Term Evolution), EDGE (Enhanced Data Rates for GSM Evolution, GPRS (General Packet Radio Service)), CDMA2000 (Code Division Multiple Access 2000), WiFi, etc., as long as the principles described hereinafter are applicable. As is understood, the communication system 1 may generally comprise a plurality of network nodes 4a, 4b, 11 and a plurality of UEs 3.

The UE 3 comprises an activity log database 8. The activity log database 8 is arranged to store information associated with data traffic and/or voice traffic between the UE 3 and the network nodes 4a, 4b, 11. The UE 3 may be one of a mobile terminal, a user terminal, a user agent, a mobile phone, a so-called smart phone, a tablet computers, and other handset equipment, etc. As the skilled person understands, the UE 3 is arranged communicate with a BTS over the Um interface; with an NB over the Uu interface; with an eNB over the LTE-Uu interface; and with an AP over the IEEE 802.11 interface. Thus, as schematically illustrated in FIG. 1 the UE 3 is enabled to access services and content provided by the service network in a number of different ways. As the skilled person also understands the number of such available ways to access the service network generally depends on the network topology of the actual communication network used and the functionality, capability and compatibility of the UE 3.

The communications network 1 further comprises a service provider site 5. For illustrative purposes the service provider site is associated with the network node 4a. Further, for illustrative purposes the network operator of to the service provider site 5 is the home network operator of the UE 3. It is assumed that the UE 3 is associated with a subscription account of a home network. Hence, the UE 3 is associated with a user account having a network subscription service to the service provider of the service provider site 5. In general terms the service provider site 5 comprises network interfacing entities arranged to handle information associated with data traffic and/or voice traffic between UEs 3 and network nodes 4a, 4b, 11. In order to do so the service provider site 5 comprises a service provider database 6 arranged to store such information and a service provider server 2 inter alia arranged to process the information stored in the service provider database 6.

The communications network 1 further comprises a further service provider database 7. The further service provider database 7 may be associated with a further network operator, such as a network operator of the network node with reference numeral 4b. For illustrative purposes the further service provider database 7 is associated with a network outside the home network of said user account.

The communications network 1 may further comprise a roaming broker database 10. The roaming broker database to may be operatively connected to the network nodes 4a, 4b, 11. The roaming broker database to may provide information to the UE 3 for facilitating appropriate network selection. The UE 3 may be arranged to register with the roaming broker database to via one of the network nodes 4a, 4b, 11.

In mobile communications networks such as the mobile communications network 1 of FIG. 1, the operators' (both of the home network and any network outside the home network) systems sometimes lose track of the accruing service costs for user accounts. In turn, this may cause settlement mistakes to happen, thus forcing end users to pay for calls they did not make, or for incoming roaming calls they did not answer, or for data not received. The embodiments disclosed herein relate to providing verified network activity/usage data. In order to obtain verified network activity/usage data there is provided a service provider server, a method performed in the service to provider server, and a computer program comprising code, for example in the form of a computer program product, that when run on the service provider server, causes the service provider server node to perform the method.

Figure 2:
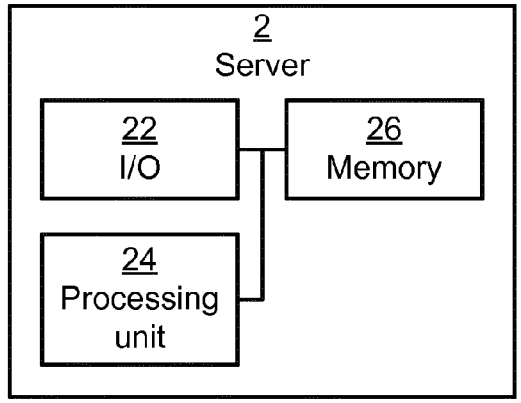
FIG. 2 is a schematic diagram showing functional modules of a service provider server.

FIG. 2 schematically illustrates, in terms of a number of functional modules, the components of a service provider server 2. A processing unit 24 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 32 (as in FIG. 3), e.g. in the form of a memory 26. Thus the processing unit 24 is thereby arranged to execute methods as herein disclosed. The memory 26 may also comprise persistent storage, which, for example, can be any single one or combination of magnetic memory, optical memory, solid state memory or even remotely mounted memory. The service provider server 2 may further comprise an input/output (I/O) interface 22 for receiving and providing information from/to other devices and entities in a network operatively connected to the service provider server 2 and from/to the databases 7, 8, 10. According to embodiments the I/O interface 22 supports Internet Protocol (IP) based communications. The I/O interface 22 may thus be arranged to receive and transmit IP based messages. The processing unit 24 controls the general operation of the service provider server 2, e.g. by sending control signals to the I/O interface 22 and receiving reports from the I/O interface 22 of its operation. Other components, as well as the related functionality, of the service provider server 2 are omitted in order not to obscure the concepts presented herein.

Figure 3:
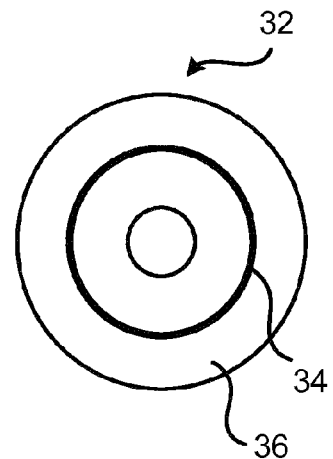
FIG. 3 shows one example of a computer program product comprising computer readable means.
Figure 4:
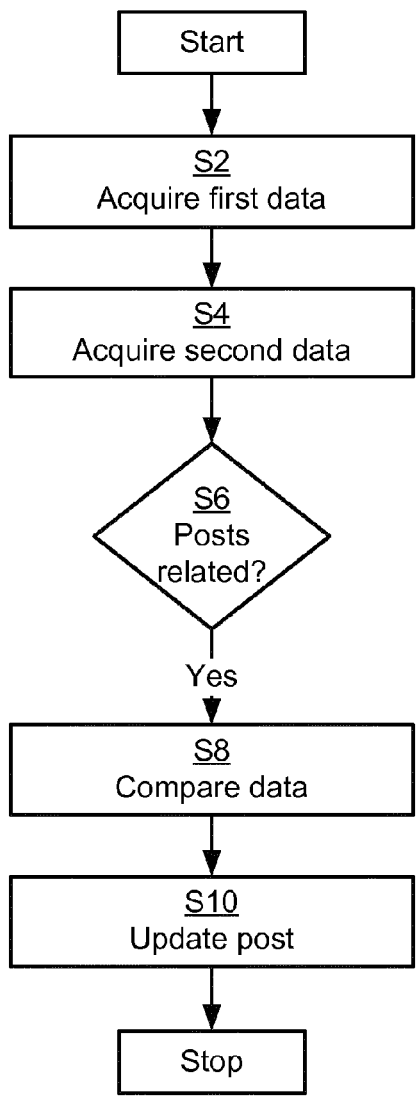
FIGS. 4 and 5 are flowcharts of methods according to embodiments.
Figure 5:
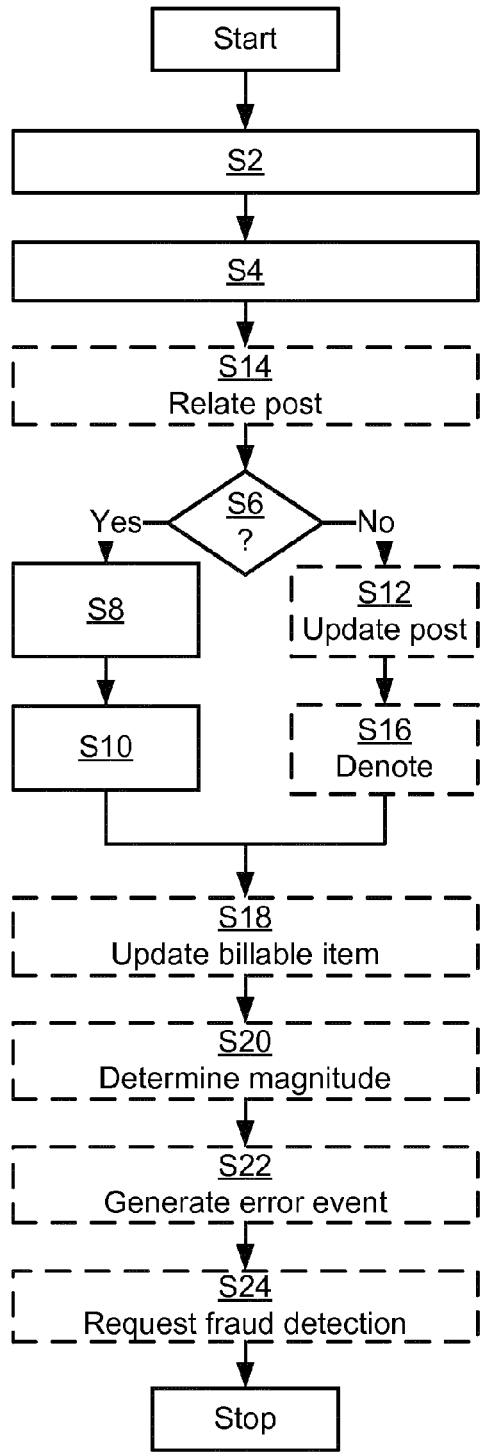

FIGS. 4 and 5 are flow charts illustrating embodiments of methods for verifying network activity metadata between a user equipment 3 and a service provider server 2. The methods are performed in the service provider server 2. The methods are advantageously provided as computer programs 34. FIG. 3 shows one example of a computer program product 32 comprising computer readable means 36. On this computer readable means 34, a computer program 34 can be stored, which computer program 34 can cause the processing unit 24 and thereto operatively coupled entities and devices, such as the memory 26, and the I/O interface 22 to execute methods according to embodiments described herein. In the example of FIG. 3, the computer program product 32 is illustrated as an optical disc, such as a CD (compact disc) or a DVD (digital versatile disc) or a Blu-Ray disc. The computer program product 32 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 34 is here schematically shown as a track on the depicted optical disk, the computer program 34 can be stored in any way which is suitable for the computer program product 32.

The enclosed embodiments are based on the understanding that activity/usage data about usage of network services is already logged both in the network itself and on the UE 3. The enclosed embodiments utilise the fact that the activity/usage data is logged independently on both sides of the network connection in order to verify that activity/usage data is correct, and if not correct to detect errors. Returning now to FIGS. 1 and 2, the herein disclosed embodiments are based on matching data logged by the networked nodes 4a, 4b, 11 (for example as stored in any of the databases 6, 7, 10) with data from the UE 3 itself (for example as stored in the database 8). A method for verifying network activity/usage data between a user equipment 3 and a service provider server 2 therefore comprises, in a step S2, acquiring a first set of network activity/usage data for a user account from a user equipment 3. The first set of network activity/usage data is acquired by the I/O interface 22 of the service provider server 2. The first set of network activity/usage data may be acquired from the activity log database 8 of the UE 3. The IP messages may be transmitted from the UE 3 to the service provider server 2 via a network node 4a, 4b, 11. The network activity/usage data of the UE 3 may be transmitted to the service provider server 2 by means of Internet Protocol (IP) messages. Thus, the I/O interface 22 may be arranged to receive IP packets. Transmission and reception of IP packets is as such known in the art. Thus, the first set of network activity/usage data may be enclosed in an IP message. How an I/O interface needs to be configured in order to receive IP packets is as such also known in the art.

Figure 6:
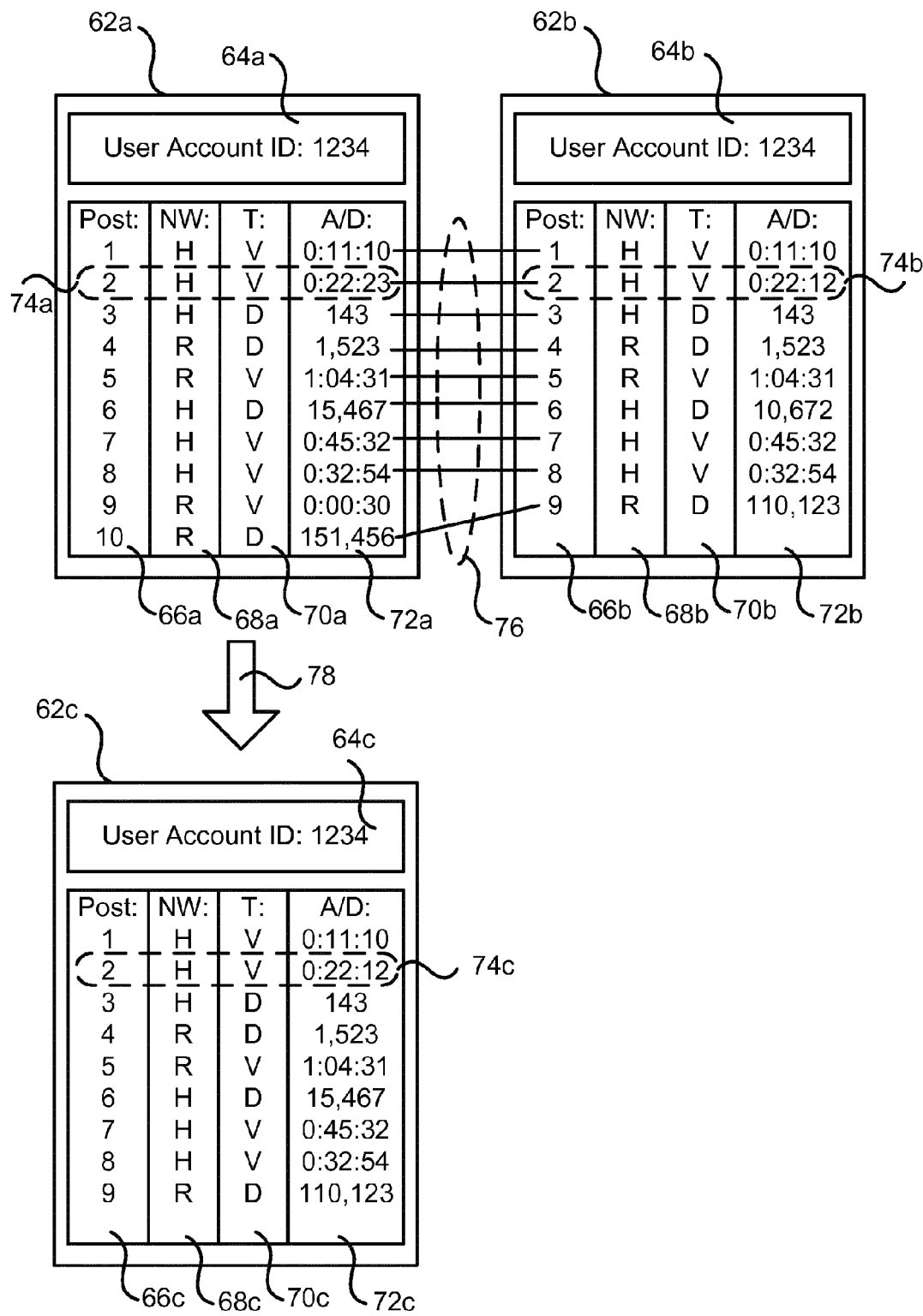
FIG. 6 schematically illustrates sets of network activity/usage data.

FIG. 6 illustrates at reference numeral 62b a first set of network activity/usage data for a user account 64a, 64b as specified by a user account identity schematically denoted "1234". The network activity/usage data may be indicative of the amount of data traffic and/or voice traffic between the user equipment and a BTS, NB or eNB 4a, 4b, or an access point 11. In more detail, FIG. 6 illustrates on the upper right-hand side a first set of network activity/usage data 62b, a second set of network activity/usage data 62a is illustrated on the upper left-hand side, and an updated set of network activity/usage data 62c is illustrated on the lower left-hand side. Each set of network activity/usage data 62a, 62b, 62c, comprises a user account identity (ID) field 64a, 64b, 64c. In the present illustrative example the user account ID is "1234". Further, each set of network activity/usage data 62a, 62b, 62c, comprises a number of posts of data. In FIG. 6 one post of data has at reference numerals 74a, 74b, 74c been identified for each set of network activity/usage data 62a, 62b, 62c. Each post 74a, 74b, 74c has a number of data fields 66a, 68a, 70a, 72a, 66b, 68b, 70b, 72b, 66c, 68c, 70c, 72c. In the illustrative example of FIG. 6, the data field 66a, 66b, 66c schematically illustrates a post number for each post of data 74a, 74b, 74c. Further, the data field 68a, 68b, 68c schematically illustrates if a certain post of data 74a, 74b, 74c represents network (NW) activity/usage in the home network (H) of the user account or in a network (R) outside the home network of the user account. Further, the data field 70a, 70b, 70c schematically illustrates the type (T) of a activity/usage for each post of data 74a, 74b, 74c, such as voice (V) traffic or data (D) traffic. Further, the data field 72a, 72b, 72c schematically illustrates the amount (A) of data transmitted or the duration (D) of any voice call for each post of data 74a, 74b, 74c.

The method further comprises acquiring, in a step S4, a second set of network activity/usage data for the user account from a subscription account of the user account. The second set of network activity/usage data is acquired by the I/O interface 22 of the service provider server 2. The second set of network activity/usage data may relate either to data traffic and/or voice traffic between the user equipment and at least one network node 4a in a home network of the user account, to data traffic and/or voice traffic between the UE 3 and at least one network node 4b, 11 in a network outside the home network of the user account, or to a combination of both. The second set of network activity/usage data may be acquired from different entities and devices, depending on to which network nodes 4a, 4b, 11 the UE 3 has exchanged data with; the exchange of data causing a network activity/usage data post to be generated.

For example, the second set of network activity/usage data may be acquired from the service provider database 6 of the home network of the user account. As noted above, the service provider database 6 may be part of the service provider site 5. Additionally or alternatively, the second set of network activity/usage data may be acquired from the service provider database 7 of a network outside the home network of the user account. Further additionally or alternatively, the second set of network activity/usage data may be acquired from the database 10 of the roaming broker.

The service provider server 2 may be arranged to acquire second sets of network activity/usage data from networks in which network activity/usage data has been registered for the user account. These sets may form an aggregated set of second set of network activity/usage data. In general terms, the aggregated second set of network activity/usage data thus pertains to the total network activity/usage data of the user account.

Once the first set of network activity/usage data and the second set of network activity/usage data have been acquired a check is performed to determine whether there is a match or not between the network activity/usage data from the UE 3 and the subscription account. The matching comprises two parts. Firstly, it is checked if a post (hereinafter denoted a second post) in the second set of network activity/usage data corresponds to any post (hereinafter denoted a first post) in the first set of network activity/usage data. Particularly, the processing unit 24 is arranged to, in a step S6, determine if a second post 74a in the second set of network activity/usage data is related to a first post 74b in the first set of network activity/usage data. The determination may be based on different parameters. For example, the determination may be based on a specific identification code. In each set of network activity/usage data, each post may have its own specific identification code. The determination may the be based on comparing the specific identification code stored in the second post 74a to specific identification codes of posts, such as the first post 74b, stored in the first set of network activity/usage data. For example, the determination may be based on time stamps. Further, the determination may thus be based on comparing a time stamp of the second post 74a to time stamps of posts, such as the first post 74b, stored in the first set of network activity/usage data. If no match is found an error event may be generated, see below. In FIG. 6, all related posts in the first set of network activity/usage data and in the second set of network activity/usage data are identified by lines 76 between the related posts. Secondly, when a matching pair comprising a first post and a related second post has been found it is checked if data of the second post corresponds to data of the first post. Particularly, the processing unit 24 is arranged to, in a step S8, compare first data 66b, 68b, 70b, 72b of the first post 74b to second data 66a, 68a, 70a, 72a of the second post 74a.

The comparison may comprise an optional step S20, as performed by the processing unit 24, of determining a magnitude of a difference between the first data 66b, 68b, 70b, 72b and the second data 66a, 68a, 70a, 72a. For example, if the first data 72b concerns data transmission, the first data 72b may represent the amount of data having been transmitted. For example, if the first data 72b concerns a voice call, the first data 72b may represent the duration of the voice call. The comparison may comprise a further optional to step S22, as performed by the processing unit 24, of generating an error event message in a case the magnitude is larger than a predetermined threshold value. The threshold value may depend on whether the data represents data transmission or a voice call. The threshold value may further be related to a monetary value. Hence the threshold value used may be determined by setting a monetary value. Thereby any difference found may be related to a monetary value. Different threshold values may be set according to different applications. Further, an error message may also be generated if no match at all between a second post in the first set of network activity/usage data and posts in the first set of network activity/usage data has been found in step S6.

As a further optional step, a fraud detection software application may, in a step S24, be requested to be initiated in the UE 3 in response to an error event message having been generated. Initiation of the fraud detection software application may be enabled by the service provider server 2 sending messages to the UE 3. As noted above, message exchange between the service provider server 2 and the UE 3 may be based on the Internet Protocol. Hence the messages to initiate the fraud detection software application may be enclosed in IP messages. The fraud detection software application may be arranged to determine whether or not the activity log database 8 of the UE 3 has been manipulated so as to alter or remove network activity/usage data posts as stored therein. Fraud detection software applications are as such known in the art.

The method for verifying network activity/usage data further comprises, in a step S10, updating the second post with the first data in a case the first data does not match the second data. Step S10 is thus dependent on steps S6 and step S8. The updating is performed by the processing unit 24. The processing unit 24 is thus arranged to provide the holder (such as the database 6) of the second set of network activity/usage data with instructions to update the second post with the first data. Hence the instructions may comprise identification of what post to be updated and also with what data to update the post. The updating may comprise removal of an erroneous entry. For example, in a case the second post 74a is not related to any post in the first set of network activity/usage data the second post 74a may be updated by being removed from the second set of network activity/usage data 62a. Hence the instructions to the holder may comprise a delete command. Upon having repeated at least steps S6, S8, S10 the second set of network activity/usage data 62a has been updated to an updated set of network activity/usage data 62c, as schematically illustrated by arrow 78 in FIG. 6.

The herein disclosed embodiments may be applied in scenarios and applications where the second post may be related to a subscription item of the user account. Thus, in an optional step S14, the second post may be related to a subscription item of the user account. The herein disclosed embodiments may thereby be applied in scenarios and applications for producing verified invoices for subscriptions associated with the user account of the UE 3, such as mobile phone and broadband subscriptions. The activity/usage data logged on one or several UEs 3, is, as disclosed above, compared to the operator-side network activity/usage data for the same user account. More particularly, the second post may in an optional step S14 be related to a subscription item of the user account. In an optional step S16, the subscription item may be denoted as a verified subscription item in a case the first data does match the second data. Thus, ideally, the activity/usage data is a match and the system can generate a verified invoice from that activity/usage data. If it is not a match the erroneous activity/usage data can be corrected before an invoice is generated and sent to the subscriber.

Further, the subscription item may be related to a billable network subscription service of the user account. The billable network subscription service is related to the home network of the user account. In an optional step S18, the subscription item may therefore be updated in response to the second post being updated in step S10 or step S12.

Two typical scenarios herein provided as exemplary embodiments where the disclosed subject matter may readily apply will be disclosed next. However, as the skilled person understands, these are just a few examples of possible scenarios where the disclosed subject matter may readily apply.

Scenario 1:

A first scenario relates to a situation where an erroneous post is removed. Consider post 9 in the second set of network activity/usage data 62a in FIG. 6. Post 9 concerns a voice call (V) of duration (D) 0:00:30, i.e. 0 hours, 0 minutes and 30 seconds in a network (R) outside the home network of the subscriber with user account 1234. Upon performing step S6 a related post in the first set of network activity/usage data 62b in FIG. 6 is not found. It is therefore determined that the post 9 in the second set of network activity/usage data 62a is an erroneous entry. The post 9 is therefore updated according to step S12, i.e. in that the post 9 is removed from the second set of network activity/usage data 62a. This could be a situation where the post 9 has been recorded as a result of a network connection failure between the UE 3 and a network node 4b in a network outside the home network of the subscriber, or wherein a incoming voice call has been connected directly to a voice mail service of the user account.

Scenario 2:

A second scenario relates to a situation where an erroneous post is changed. Consider post 10 in the second set of network activity/usage data 62a in FIG. 6. Post 10 concerns a data transmission (D) of 151,456 kbyte of data (D) in a network (R) outside the home network of the subscriber with user account 1234. Upon performing step S6, post 9 in the first set of network activity/usage data 62b in FIG. 6 is determined to be a related post. Upon comparing, in step S8, second data 72b of post 10 in the second set 62a to first data 72a in the first set 62a it is determined that the data of the posts do not match. It is therefore determined that the data of post 10 in the second set of network activity/usage data 62a is erroneous. The post 10 in the second set 62a is therefore updated according to step S10, i.e. in that the data 72a of the post 10 in the second set 62a is updated with the data 74b of the post 9 in the first set 62b. This could be a situation where the data transmission to the UE 3 has not been interrupted, and therefore not completed.

The inventive concept has mainly been described above with reference to a few embodiments and scenarios. However, as is readily appreciated by a person skilled in the art, other embodiments and scenarios than the ones disclosed above are equally possible within the scope of the inventive concept, as defined by the appended patent claims.

The invention claimed is:

1. A method for verifying network activity/usage data between a user equipment and a service provider server, the method being performed in the service provider server, the method comprising:
   acquiring a first set of network activity/usage data for a user account from a user equipment;
   acquiring a second set of network activity/usage data for said user account from a subscription account of said user account; and
   determining if a second post in said second set of network activity/usage data is related to a first post in said first set of network activity/usage data, and if so:
      comparing first data of said first post to second data of said second post; and
      updating said second post with said first data in a case said first data does not match said second data.

2. The method according to claim 1, further comprising, in a case said second post is not related to any post in said first set of network activity/usage data:
   updating said second post by removing said second post from said second set of network activity/usage data.

3. The method according to claim 1, further comprising:
   relating said second post to a subscription item of the user account.

4. The method according to claim 3, wherein the subscription item is related to a billable network subscription service of the user account, the billable network subscription service being related to a home network of the user account.

5. The method according to claim 3, further comprising:
   denoting said subscription item as a verified subscription item in a case said first data does match said second data.

6. The method according to claim 3, further comprising:
   updating said subscription item in response to said second post being updated.

7. The method according to claim 1, wherein the network activity/usage data is indicative of the amount of data traffic and/or voice traffic between the user equipment and a base transceiver station, a NodeB, an evolved NodeB, and/or an access point.

8. The method according to claim 1, wherein the second set of network activity/usage data relates to data traffic and/or voice traffic between the user equipment and at least one network node in a home network of said user account.

9. The method according to claim 1, wherein the second set of network activity/usage data relates to data traffic and/or voice traffic between the user equipment and a network node in a network outside the home network of said user account.

10. The method according to claim 1, wherein the second set of network activity/usage data is acquired from a service provider database of a network outside the home network of said user account.

11. The method according to claim 1, wherein the second set of network activity/usage data is acquired from a database of a roaming broker.

12. The method according to claim 1, wherein the first set of network activity/usage data is acquired from an activity log database of the user equipment.

13. The method according to claim 1, wherein the first set of network activity/usage data is enclosed in an Internet Protocol, IP, message.

14. The method according to claim 1, further comprising:
   determining a magnitude of a difference between the first data and the second data; and
   generating an error event message in a case said magnitude is larger than a predetermined threshold value.

15. The method according to claim 14, further comprising:
   requesting a fraud detection software application to be initiated in the user equipment in response to the error event message having been generated.

16. A service provider server for verifying network activity/usage data between a user equipment and the service provider server, the service provider server comprising:
   an input/output, I/O, interface arranged to acquire a first set of network activity/usage data for a user account from a user equipment;
   the I/O interface further being arranged to acquire a second set of network activity/usage data for said user account from a subscription account of said user account; and a processor arranged to determine if a second post in said second set of network activity/usage data is related to a first post in said first set of network activity/usage data, and if so to:
  compare first data of said first post to second data of said second post; and to
  update said second post with said first data in a case said first data does not match said second data.

17. A computer program for verifying network activity/usage data between a user equipment and a service provider server, the computer program comprising computer program code which, when run on the service provider server, causes the service provider server to:
  acquire a first set of network activity/usage data for a user account from a user equipment;
  acquire a second set of network activity/usage data for said user account from a subscription account of said user account; and
  determine if a second post in said second set of network activity/usage data is related to a first post in said first set of network activity/usage data, and if so:
    compare first data of said first post to second data of said second post; and
    update said second post with said first data in a case said first data does not match said second data.

18. A computer program product comprising a computer program according to claim 17 and a non-transitory computer readable medium on which the computer program is stored.

* * * * *